3,170,979
OPTICAL IMAGE INTERPOSING DISPLAY DEVICE
Alan W. Baldwin, 4406 Panorama Drive SE., and Henry
P. Birmingham, 2505 Branch Ave. SE., both of Washington, D.C.
Filed Apr. 30, 1962, Ser. No. 191,382
1 Claim. (Cl. 88—1)
(Granted under Title 35, U.S. Code (1952), sec. 266)

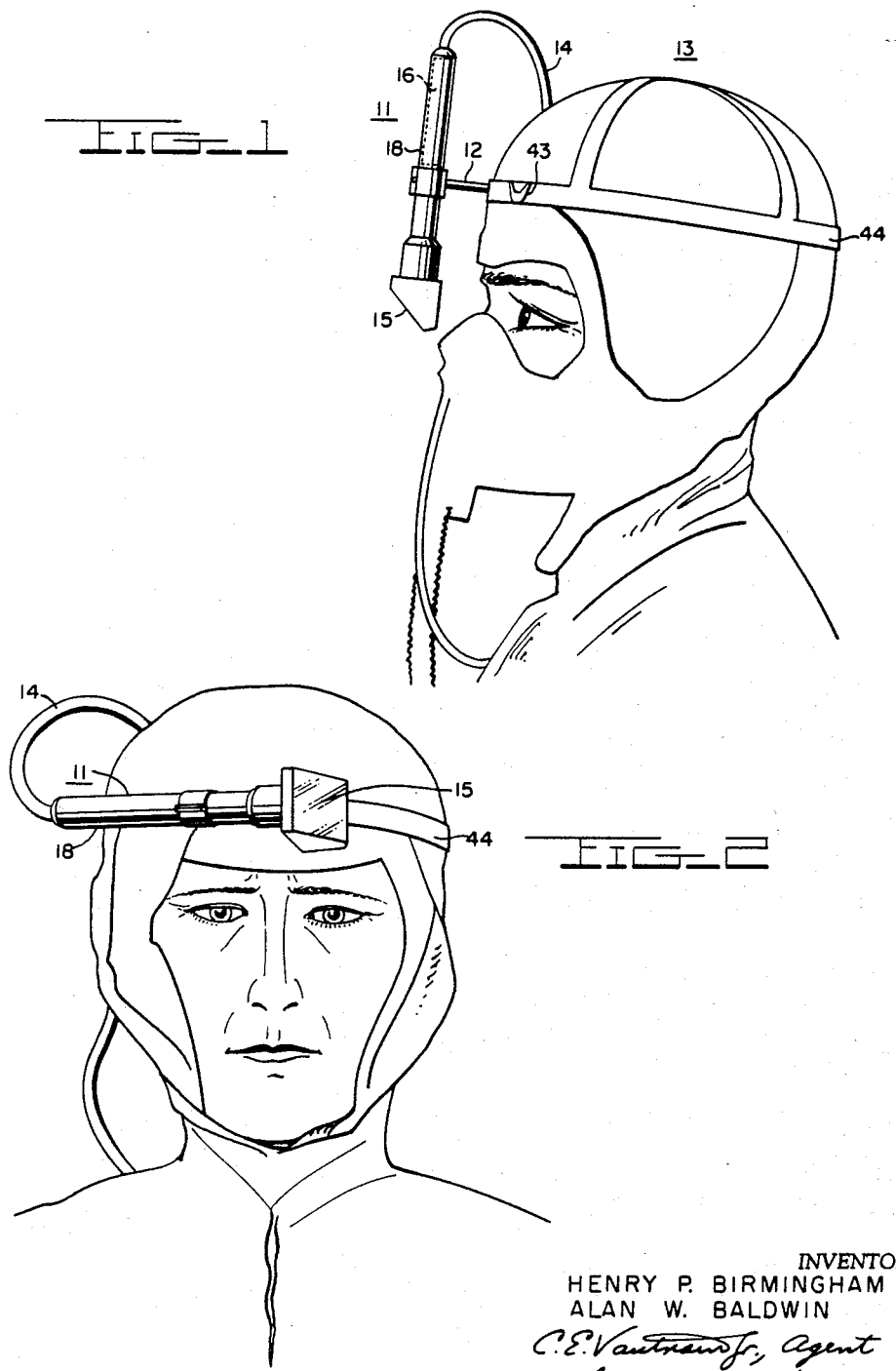

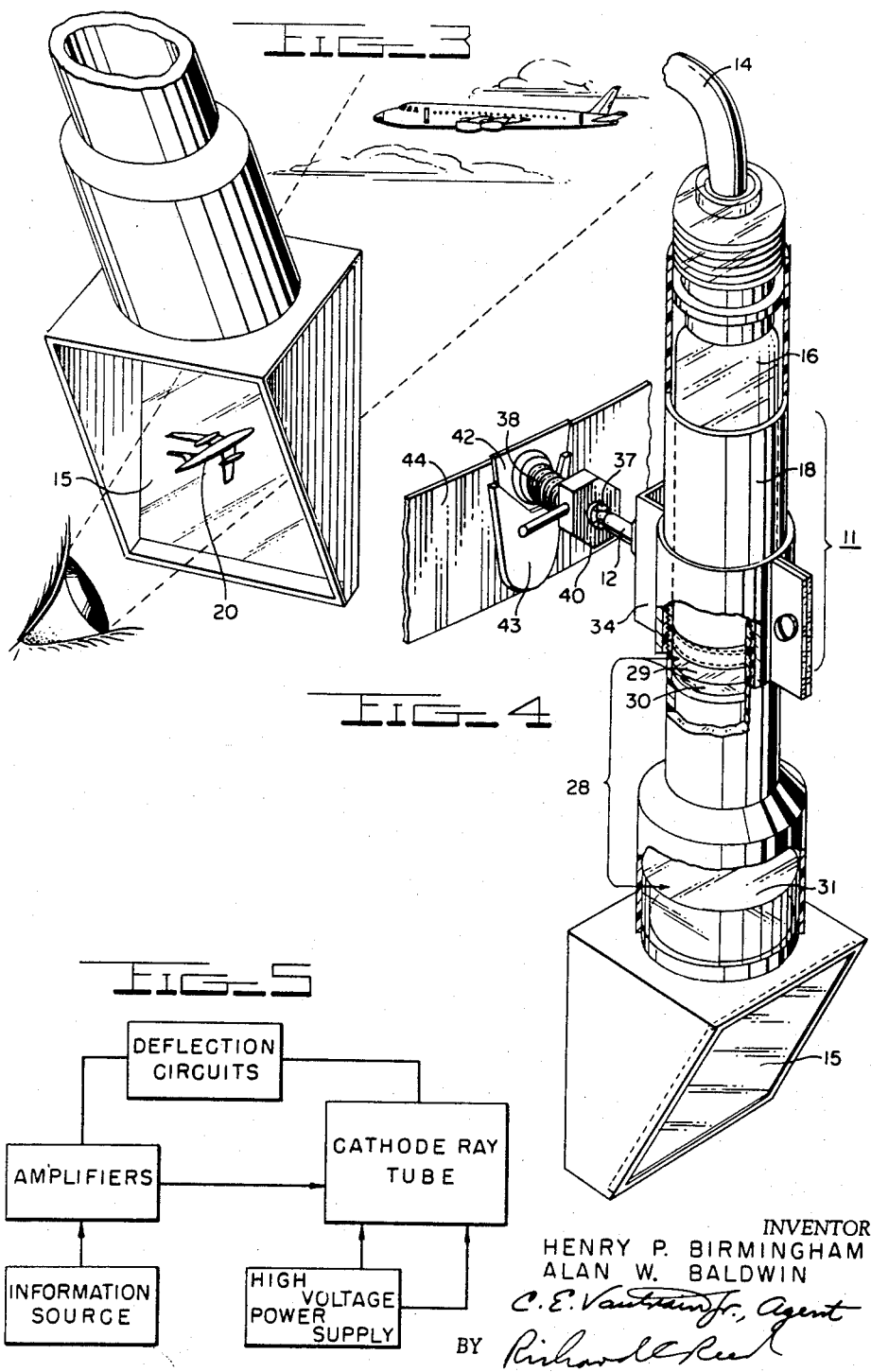

The invention described herein may be manufactured and used by or for the Government of the United States of America for governmental purposes without the payment of any royalties thereon or therefor.

The present invention relates to visual display means in general and more particularly to means for interposing or superimposing an image on the normal background environment without affecting the normal vision of a person.

There are many applications in which an operator of equipment or of a vehicle is required to scan or scrutinize a screen displaying pictorial information, which is constantly changing, in addition to his duties as operator to maintain continual visual awareness of his surroundings. Past means for providing pictorial information or placing it within view of an operator require that the operator devote his attention to viewing either his environment or, diverting his attention from his environment, to viewing the pictorial means.

The duties of a pilot of aircraft in both flying the craft and viewing a scope or other display of continually changing information is one example of the field or area in which the present invention is of extreme value. More specifically, a major problem in the use of airborne radar or other visual display equipment is a reluctance of the pilot to concentrate his entire attention on a scope, or to divide his attention sufficiently to follow with reasonable accuracy scope information changes as well as changes in his environment.

The observer or operator thus is unable to fix sufficient attention on either one or the other displays, that is, environmental or image. The observer or operator cannot give full attention to either display, and current methods of providing scope display or pictorial display do not include means whereby the observer may see both his environment and a display and move his head normally or nearly normally while viewing both environment and display. Fixed composite displays are available, however this type of display restricts head motion to fixed viewing in one direction, limits the field of view, and does not permit the observer the advantage of movement or normal binocular viewing of both displays or environment at the same time.

Where radar scopes or other means for presenting information are used the screen on which the display is shown must be of sufficient size to permit reading and understanding at a distance, and the size of such display requires the use of panel space which may be otherwise used to greater advantage were the display not on the panel. This and other disadvantages of current display means for operators and observers is overcome by the present invention, as will be explained in the following description and objects.

Accordingly, it is an object of the present invention to provide means for displaying changing symbolic or pictorial information in a very limited space.

It is another object to provide display means for the operator or observer of a moving craft which does not require interruption of his viewing of his environment while viewing the display means.

It is a further object of the present invention to provide displaying means for an observer or operator which may be mounted on and moved freely with the head of the person observing or operating.

It is a further object of the present invention to provide pictorial display means which will permit an operator or observer to view environment and pictorial display means simultaneously without having to divide his attention between one or the other.

It is a still further object of the present invention to provide viewing means which do not require the use of panel or wall space in an enclosure, and may be readily placed in or removed from the field of vision of the wearer.

Other objects and many of the attendant advantages of this invention will be readily appreciated as the same becomes better understood by reference to the following detailed description when considered in connection with the accompanying drawings wherein:

FIG. 1 illustrates a portable cathode ray scope mounted on the head of the wearer.

FIG. 2 shows the wearer with portable scope removed from the field of vision.

FIG. 3 is an isometric drawing showing the relative position of the displayed image within the normal field of vision of the weaver of the scope.

FIG. 4 is a schematic drawing partly in section of the components of the miniature scope used in this invention, and FIG. 5 is a block diagram of the components of the invention.

Referring to FIG. 1, there is shown a miniature scope assembly 11 attached by shaft 12 to supporting harness 13. Power cable 14 conveys information to the assembly. The scope and attachments may be worn with negligible inconvenience in addition to the normal helmet, oxygen mask, etc., worn by pilots and other operating personnel, any may be positioned over either eye by placement in receptacles 43 provided in belt 44 of harness 13.

The assembly 11 includes a half-silvered see-through mirror 15 on which appears the image formed on the scope of cathode ray tube 16 within the assembly. The components of the assembly are shown more in detail in FIG. 4.

FIG. 2 illustartes the assembly turned 90° about shaft 12 from its position in FIG. 1 to permit removal from the field of vision.

Although the embodiment of FIGS. 1 and 2 displays a cathode ray tube having a diameter of about 1 inch and enclosed in an elongated container 18 of solid material, it will be appreciated that tubes of varying small sizes may be used and that the image may be interposed in front of one or both eyes of the observer or operator in other manner than shown herein, for instance, the assembly may be suspended from a bar which is secured to harness 13 such that the cathode ray tube lenses and see-through reflecting surface may be movable across such bar to position the image before one or the other of the wearer's eyes as desired by the wearer, or to position two such devices to provide a dual display of the image.

The image appearing on the phosphor of the cathode ray tube is viewed by the wearer as it is reflected from half-silvered mirror 15 after having been magnified as desired by a lens assembly 28 shown in FIG. 4.

In FIG. 3 the display image is indicated at 20 and appears on a surface, i.e., mirror 15, positioned at an angle of 45° to the line of vision of the wearer. Mirror 15 is half-silvered so that the environment may be viewed in considerable detail through the non-silvered or clear portions thereof. It will be appreciated that the display image may be projected into the view of the observer or operator in other manner within the scope of this invention, the focal point thereof being the interposition into the field of view of an observer or operator of a symbolic or pictorial presentation which the observer or operator may view while maintaining continuous visual observation of his environment.

FIG. 4 illustrates assembly 11 in detail and includes casing or container 18 into which is fitted cathode ray tube 16, lens assembly 28 comprising plano-concave lens 29 and concavo-convex lenses 30 and 31, with the lenses positioned to project on surface 15 an image which is focused at optical infinity. Casing 18 is movable vertically within clamp 34 and held in position by tightening of that clamp. Assembly 11 is pivotable about shaft 12 which shaft provides for horizontal movement away from or toward the wearer through movement within collar 37 the outer surface of which is threaded as indicated at 38. The outer end of collar 37 is slotted to permit closure thereof about shaft 12 upon turning nut 40 clockwise. Nut 40 and collar 37 provide means for selectively tightening over shaft 12 so that assembly 11 is loosely held, or held with any degree of pressure desired or locked in place. Collar 37 is attached to plate 42, and receptacle 43, shown here attached to belt 44 of harness 13, is contoured to receive plate 42 in snug fit thereby providing firm means for supporting the assembly on the wearer. Other receptacles may be placed in the vicinity of the operator or observer to facilitate rapid and easy stowage of the display means as desired when it is not in use.

The block diagram of FIG. 5 illustrates the electrical components of the invention, including an information source which may be a carrier signal, signal generator or the like, amplifiers for amplifying the signal, deflection circuits to control the cathode ray beam, a high voltage power supply, and the cathode ray tube for displaying pictorially the intelligence introduced into the circuit. The cathode ray tube included in the embodiment described herein has an effective screen surface of 5/8" diameter and an overall length of 2¾", however, other cathode ray tubes of comparable size and having comparable characteristics may be used within the scope of the invention.

The lenses shown in FIG. 4 are, in the present embodiment, a set of compound lenses arranged to provide for a 15-degree viewing field and an image focused at optical infinity. The half-silvered mirror is placed at an angle of 45 degrees to the centerline of the cathode ray tube gun element to provide for normal vision superimposed by the reflected image of the cathode ray tube trace. The entire assembly measures approximately 1¼" by 5", weighs less than 6 ounces, and may display either search or attack information superimposed on a normal viewing field comparable to that of a 7-inch radar display. Selection of either search or attack information is made by means of a channel switch circuit, not shown, located on the amplifier chassis.

The field-of-vision display means of the present invention permits continual viewing of the user's environment through normal vision of one eye and with negligible loss of normal vision through the other eye. By means of the present invention the user may relate the displayed image, whether of symbolic or pictorial information, to what is open to normal view beyond it in his environment—both in adjacent areas and up to infinite distances. The displayed information does not materially interfere with normal binocular vision, and the user may now receive information within his field of vision without requiring him to fix his attention on a scope or other display surface which is fixed in the area adjacent to him.

Another important advantage of the invention is the freedom of head movement permitted while viewing the displayed information. It is no longer necessary for the person receiving the additional information to focus his attention on a fixed display surface to the exclusion of his environment, and by not having to so focus his attention the person using the device is permitted freedom of head and body movement which serves to reduce fatigue where attention would normally be fixed for appreciable periods of time. The adaptability to use either eye, in the alternate embodiment suggested in the foregoing, will further tend to reduce fatigue and prolong the period during which an operator or observer may use the invention. The use of dual devices to provide dual images is a further advantage to be realized from this invention. Other means to reflect the display image into the field of vision of the operator or observer may be used, such as a mirror having alternate parallel strips of reflecting material and transparent glass, within the scope of this invention, and may provide still greater clarity of image and relief from fatigue to an observer or operator of the interposed image display device of the present invention.

Obviously, many modifications and variations of the present invention are possible in the light of the above teachings. It is therefore to be understood that within the scope of the appended claim the invention may be practiced otherwise than as specifically described.

What is claimed is:

A visual display device for superposing an image on background environment without affecting a viewer's normal vision comprising, in combination, a cylindrical housing member having an end portion substantially enlarged in cross section;

a cathode ray tube positioned in said cylindrical housing opposite said enlarged end portion for receiving remote images;

rectangular mirror holding means attached to said enlarged end portion of said cylindrical housing member;

a half silvered rectangular mirror positioned at an angle of 45° within said mirror holding means;

plano-concavo lens means adjacent said cathode ray tube;

concavo-convex lens means adjacent said plano concavo lens means and within said enlarged end portion, whereby said lenses are positioned to project an image received from said cathode ray tube and said mirror at optical infinity;

a head harness formed of straps contoured to fit over the head of a viewer;

a pair of receptacles secured to said head harness, each of said receptacles being located thereon so as to be substantially positioned above a respective eye of a viewer wearing said harness and each of said receptacles being individually adapted to support said cylindrical housing member, thereby providing a ready means of selectively positioning said housing member over either eye of a viewer wearing said harness;

substantially cylindrically contoured adjustable clamp means disposed about said cylindrical housing member for vertical adjustment into a viewer's normal vision of said cylindrical housing member when it is supported by one of said receptacles;

a cylindrical shaft upon which said clamp means is pivotally mounted whereby said cylindrical housing member, when supported by one of said receptacles, may be moved in an arc before the face of a viewer wearing said harness so as to be positioned out of his field of vision;

a collar member having a threaded outer surface and an internal bore extending from one end of said collar member within which said shaft is slidably mounted for horizontal adjustment of said cylindrical housing member away from or toward a viewer wearing said harness, said one end of said collar member having radial slots to enable compression of said one end to compressingly engage said cylindrical shaft;

a locking nut rotatably mounted on said threaded outer surface whereby said nut, upon rotation thereof toward said one end, engagingly compresses said one end around said cylindrical shaft; and a plate member affixed to the other end of said collar member and configured to be securedly received within any one of said receptacles in a manner to support said cylindrical housing member in front of the face of a viewer wearing said harness.

References Cited by the Examiner

UNITED STATES PATENTS

| 1,014,551 | 1/12 | Winton | 287—133 |
| 1,800,981 | 4/31 | Beste | 287—53 |
| 2,848,924 | 8/58 | Potez | 88—36 |
| 2,872,840 | 2/59 | Stanton | 88—1 |
| 3,059,519 | 10/62 | Stanton | 88—1 |

FREDERICK M. STRADER, *Primary Examiner.*

JEWELL H. PEDERSEN, *Examiner.*